United States Patent [19]

Hulyer

[11] Patent Number: 4,567,508

[45] Date of Patent: Jan. 28, 1986

[54] TWO-CHANNEL COMPATIBLE TELEVISION TRANSMISSION SYSTEM FOR WIDE PICTURE FORMATS

[75] Inventor: Michael G. Hulyer, Crawley Down, England

[73] Assignee: U.S. Philips Corporation, New York, N.Y.

[21] Appl. No.: 552,540

[22] Filed: Nov. 16, 1983

[30] Foreign Application Priority Data

Dec. 22, 1982 [GB] United Kingdom ............... 8236369

[51] Int. Cl.⁴ .................... H04N 11/20; H04N 11/06
[52] U.S. Cl. ........................................ 358/11; 358/12; 358/140; 358/141
[58] Field of Search ................... 358/11, 12, 13, 14, 358/15, 140, 141

[56] References Cited

U.S. PATENT DOCUMENTS

| | | | |
|---|---|---|---|
| 4,125,862 | 11/1978 | Catano | 358/140 |
| 4,335,393 | 6/1982 | Pearson | 358/11 |
| 4,400,719 | 8/1983 | Powers | 358/11 |
| 4,467,356 | 8/1984 | McCoy | 358/12 |

Primary Examiner—Michael A. Masinick
Attorney, Agent, or Firm—Thomas A. Briody; William J. Streeter; Edward W. Goodman

[57] ABSTRACT

A television transmission system for the simultaneous transmission of television signals, depicting the same scene, for standard and wide picture formats of, respectively, a standard aspect ratio and a wider than standard aspect ratio. The television signal (FIG. 2) for the scene having 1249 lines per field is divided to produce a first television signal (FIG. 4) of 625 lines per field representing the wide picture format where adjacent lines of a field are derived from alternate lines of the scene television signal and a second television signal (FIG. 3) also of 625 lines per field representing the standard picture format where adjacent lines of a field are derived from the intervening lines of the scene television signal. The first and second television signals may be received together for the provision of a wide screen television display and the invention has the advantage that the second television signal may be received alone by currently manufactured television receivers for reproduction of a display of standard aspect ratio.

12 Claims, 11 Drawing Figures

TWO-CHANNEL COMPATIBLE TELEVISION TRANSMISSION SYSTEM FOR WIDE PICTURE FORMATS

BACKGROUND OF THE INVENTION

The invention relates to a television transmission system for the simultaneous transmission of television signals from the same scene for standard and wide picture formats of, respectively, a standard aspect ratio and a wider than standard aspect ratio with both picture formats having the same height, in which a wide band television signal, which represents the full width of the wide picture format, having n lines per picture is converted into a narrower band television signal, also representing the full width of the wide picture format, having m lines per picture where m is substantially ½n with both signals having the same field and picture rates, respective adjacent lines of a field of said converted television signal being derived from respective alternate lines in a field of said wide band signal. The invention also relates to television transmission and reception equipment for use with such a system.

Television signals in most countries of the world are transmitted in such a manner that they can be correctly displayed on a display system having a picture format with a standard aspect ratio of 4:3 where the picture width is greater than the height. Much discussion has taken place in recent years on the subject of the possible transmission of television signals where the picture format is of greater width than at present and one proposal has been to employ an aspect ratio of 5:3. Some experimental work has already taken place in Japan using a picture format with as aspect ratio of 5:3 with a line standard above that for standard transmission (625 lines). However, such work has led to signals which have to use a display format of 5:3 aspect ratio and which are not compatible with standard transmissions and cannot be received by television receivers designed to reproduce standard television transmissions.

SUMMARY OF THE INVENTION

It is an object of the invention to provide a television transmission system for the transmission of television signals which are capable of being reproduced on displays for either standard or wide picture formats.

The invention provides a television transmission system for the simultaneous transmission of television signals from the same scene for standard and wide picture formats for, respectively, a standard aspect ratio and a wider than standard aspect ratio with both picture formats having the same height, in which a wide band television signal, which represents the full width of the wide picture format, having n lines per picture is converted into a narrower band television signal, also representing the full width of the wide picture format, having m lines per picture where m is substantially ½n with both signals having the same field and picture rates, respective adjacent lines of a field of said converted television signal being derived from respective alternate lines in a field of said wide band signal, characterized in that said wideband television signal is converted into a second simultaneous narrower band television signal representing the width of the standard picture format and having the same number of lines and the field and picture rates as the first mentioned converted signal, respective adjacent lines of a corresponding field of said second converted signal being derived from the respective intervening lines of the field of said wide band signal, said first and second converted signals being transmitted by way of respective first and second transmission paths, the system being such that the transmissions from said first and second transmission paths may be received together and a wide band television signal having n lines per picture reconstituted from said first and second converted signals for reproduction as a wide picture format television display or the transmission from the second transmission path may be received alone for reproduction as a television display of standard picture format and normal quality as herein defined.

By the expression "a television display of standard picture format and normal quality" is meant one which is of the same format and at least comparable with the quality as produced by the average domestic television receiver as presently available of a corresponding display screen signal when viewed at a typical viewing distance appropriate to the screen size.

The converted signals may be color television signals in which case their transmissions may contain periodic bursts at the frequency of a color subcarrier for synchronizing purposes.

The first converted signal may contain a steering signal during a blanking interval thereof for controlling the reconstitution of the wide band signal from the converted signals. This allows the second converted signal to relate to the area of main interest in the scene.

The transmission paths may comprise respective radio frequency television channels having different carrier frequencies, the respective lower and upper or upper and lower sidebands of a radio frequency transmission, or the record/reproduce channels of video recorder apparatus.

Where the first and second transmission paths are the record/reproduce channels of separate video tape recorders these recorders may be controlled to ensure synchronization therebetween by means of the periodic bursts at the frequency of said color subcarrier in the transmissions of said first and second transmission paths.

The invention also provides television transmission equipment for use with the above television transmission system comprising means for providing a wide band television signal having n lines per picture representing the full width of the wide picture format, means for producing a first narrower band converted television signal of m lines per picture, where m is substantially ½n, and having the same field and picture rates and representing the full width of the wide picture format at said wide band signal from said wide band signal, said first converted signal having respective adjacent lines of a field derived from respective alternate lines of a field of said wide band signal, characterized in that said equipment additionally comprises means for simultaneously producing a second narrower band converted television signal having the same number of lines and the same field and picture rates as said first converted signal, said second converted signal representing the reduced width of the standard picture format and having respective adjacent lines of a field derived from respective intervening lines of a field of said wide band signal.

A raster conversion arrangement may be provided for receiving the wide band television signal and for producing therefrom the first converted signal expanded to occupy substantially twice the period per line of that of the wide band signal, the raster conversion arrangement also producing from the wide band signal the second converted signal also expanded to occupy substantially twice the period per line of that of the wide band signal. The period per line occupied by picture information may be greater in the first converted signal than in the second converted signal.

Where the television transmission equipment is for the transmission of color television signals, the synchronizing bursts at the frequency of the color subcarrier in the first and second converted signals may have a given phase relationship.

The invention further provides television reception equipment for use with the above television transmission system comprising a first input for receiving said first converted signal having m lines per picture, means for subjecting said first converted signal to signal compression for producing a first compressed television signal having n lines per picture and the same field and picture rates as said first converted signal, said first compressed signal containing picture information in alternate of its lines which information represents the full width of the wide picture format, characterized in that said equipment additionally comprises a second input for receiving said second converted signal also having m lines per picture, means for subjecting said second converted signal to signal compression for producing a second compressed television signal having the same number of lines and the same field and picture rates as said first compressed signal, said second compressed signal containing picture information in alternate of its lines which information represents the reduced width of said standard picture format, means for adding to said second compressed signal picture information from said first compressed signal which represents those portions which lie outside the width of said standard format to produce a modified second compressed signal, and means for combining said first and modified second compressed signals in such manner as to produce a wide band television signal having picture information in each line which represents the full width of said wide picture format.

DESCRIPTION OF THE DRAWINGS

The above and other features of the invention will now be described, by way of example, with reference to the accompanying drawings, in which.

DESCRIPTION OF THE PREFERRED EMBODIMENT

Figure 1:
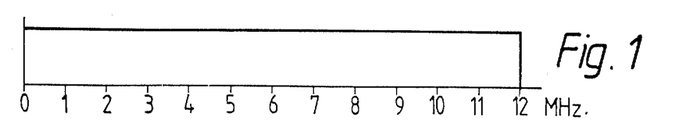
FIG. 1 is a graph of a wide band television signal.

In FIG. 1 there is shown in idealized form the frequency characteristic of a wide band television signal for a television system having 1249 lines per picture with two fields per picture and 25 pictures or frames per second. The picture format for this signal is wider than for the standard television aspect ratio of 4:3 and may have an aspect ratio of 5:3 or even greater. As will be seen from this figure, the bandwidth of the signal may be typically 12 MHz which is a little more than twice the bandwidth of current broadcast color television signals in the United Kingdom and most other countries. The signal of FIG. 1 may represent the bandwidth of the luminance signal Y in a luminance/color difference system or if derived directly from a television camera, the bandwidth of, each of the red R, green G and blue B color signals. Such a number of lines per picture coupled with the increased bandwidth even coupled with the increased aspect ratio would given an improvement in the quality of the display obtained therefrom as compared with that of the display obtained with currently manufactured color television receivers. The choice of 12 MHz for the bandwidth of the 1249 line television signal is by way of example only, but such a bandwidth would have advantages as will become apparent hereinafter.

Figure 2:
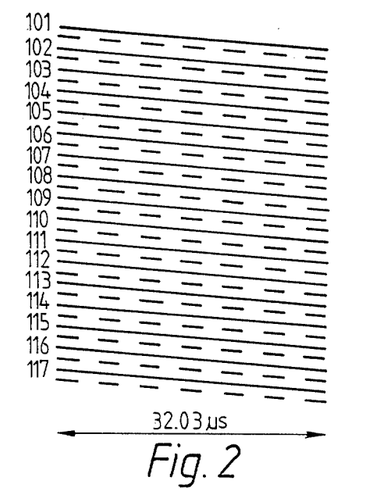
FIG. 2 shows the spatial relationship of lines of the signal of FIG. 1.
Figure 3:
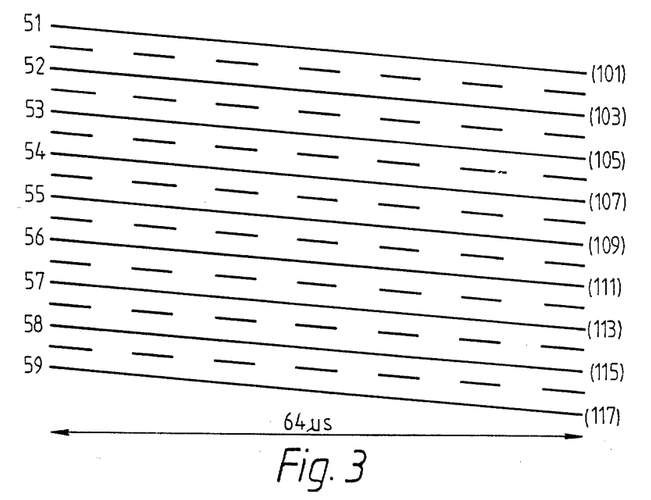
FIGS. 3 and 4 show the spatial relationship of lines of signals present in the system according to the invention.

FIG. 2 shows schematically a part of a raster of the lines of the 1249 line television signal in which each picture is formed from two interlaced fields each of 624½ lines the first of such fields being represented in FIG. 2 by the numbered full lines while the lines of the second field are shown by the unnumbered broken lines. Each television line occupies a period of 32.03 µs although the period per line during which picture information might be present may be on the order of 26 µs, the remaining parts of each line period being taken up by synchronizing and blanking signals. From the 1249 line television signal of whatever form are produced two 625 line interlaced television signals where the picture and field rates are the same as those for the 1249 line television signal, one of these 625 line signals conveying picture information for the whole of the wide picture format with the aspect ratio of 5:3 while the other 625 line signal conveys picture information for a narrower picture format with the standard aspect ratio of 4:3 and contained within the wider format. Dealing initially with the narrower picture format 625 line signal, part of the raster of its lines is shown in FIG. 3 where again the lines of the first field are indicated at the left-hand side by numbered full lines and the lines of the second field of the picture are again indicated by unnumbered broken lines. In FIG. 3, the lines of the television signal are expanded such that each line occupies a period of 64 µs, although the period per line during which picture information is conveyed is only 52 µs so as to provide the usual line blanking period. Each line of a field of the 625 line signal is derived from alternate lines of an associated field of the 1249 line signal shown in FIG. 2 and thus lines 51, 52, 53, 54, etc., of the first field of this 625 line signal are, respectively, derived from lines 101, 103, 105, 107, etc., of the first field of the 1249 line signal, the line numbers of the 1249 line signal from which they are derived being shown in brackets on the right-hand side of the FIG. 3.

Figure 4:
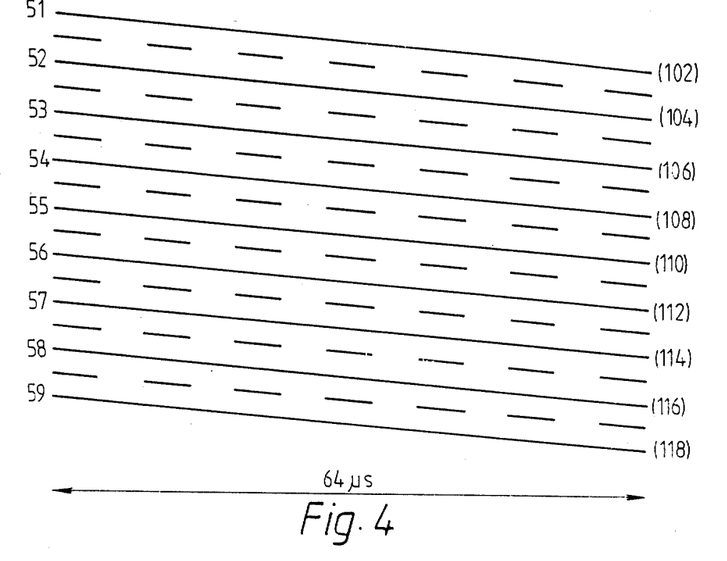

The wider format 625 line signal is shown in FIG. 4 and is formed in a similar manner to that for the other 625 line signal save that the lines of a field of the wider format 625 line signal are derived from the intervening lines of the associated field of the 1249 line signal. This is shown in FIG. 4 by the line number of the wider format 625 line signal present on the left-hand side of the Figure and with the line numbers from which they are derived in the 1249 line signal being shown in brackets on the right-hand side of the Figure. From FIG. 4 it will be seen that lines 51, 52, 53, 54, etc., of the first field of the wider format 625 line signal, respectively, derived from the lines of 102, 104, 106, 108, etc., of the first field of the 1249 line signal. With the wider format 625 line signal, the period per line containing picture information can be greater than that for the narrower format 625 line signal for reasons which will become apparent, as it is not essential to transmit a similar line blanking signal as that with the narrower format 625 line signal.

Both of the 625 line signals are derived substantially simultaneously and, due to the expansion of the line period, these signals each occupy a bandwidth which is substantially half that of the 1249 signal. The frequency characteristics of the narrower and wider format 625 line signals are, respectively, shown in FIGS. 5 and 6 with respective bandwidths of 5.5 MHz and 6 MHz.

As will be seen from FIGS. 5 and 6, both of the 625 line signals contain other signal components including a color subcarrier $f_{sc}$ at a nominal frequency of 4.4 MHz which is modulated in the appropriate PAL manner by color information signals in the form of color difference signals, the modulation extending nominally 1 MHz above and 1.5 below the frequency of the subcarrier. These color information signals are derived in a similar way to that for the 625 line signal with which they are associated. For other television systems, the subcarrier frequency and the mode of modulation may differ. A sound signal or signals $f_s$ is/are present in the narrower format 625 line signal at 6 MHz. The color synchronizing burst present with the wider format 625 line signal may be used for synchronizing purposes.

Figure 5:
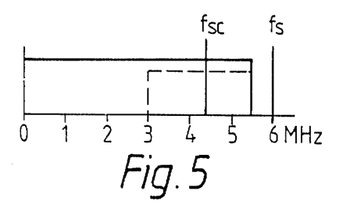
FIGS. 5 and 6 show graphs of signals present in the system according to the invention.

From an examination of FIG. 5, it will be realized that the narrower format 625 line signal is substantially of the same form as that transmitted in the United Kingdom for color television transmissions, and thus such a signal could be reproduced by conventional television receivers of current design, for which reason the present wide picture format television transmission system is compatible with current transmissions. The wide format 625 line signal does not have to be compatible and thus a larger bandwidth for the luminance information can be transmitted, subject, where necessary, to the restrictions placed on the spacings of such transmissions. At this 625 line signal does not have to be compatible with the first such signal, it can have an improved spatial response and use more than usual of each line period for the video information as it does not need to have conventional blanking and synchronizing pulses. In such a case the reference burst at the color subcarrier frequency of the order of 1 $\mu$s could be used for synchronizing purposes leaving (say) 61 $\mu$s for the video information compared with the normal 52 $\mu$s.

The two signals may be transmitted on two existing channels of the UHF bands $\overline{IV}$ or $\overline{V}$, in those bands allocated for satellite television transmissions or could be transmitted as respective upper and lower sidebands of an r.f. transmission. Alternatively, the transmission paths for the two signals could be the same or separate video tape recorders.

The wider format 625 line signal need not be transmitted in conventional line-by-line format but could be transmitted in any form of data stream such as field-by-field without the need for synchronizing signals other than say a field reference. Intermediate timing pulses might also be transmitted to ensure accurate re-timing.

The method of transmitting such data could be in any convenient way but it would have to be reformed at the receiving end of the system into line-by-line television signals.

Figure 7:
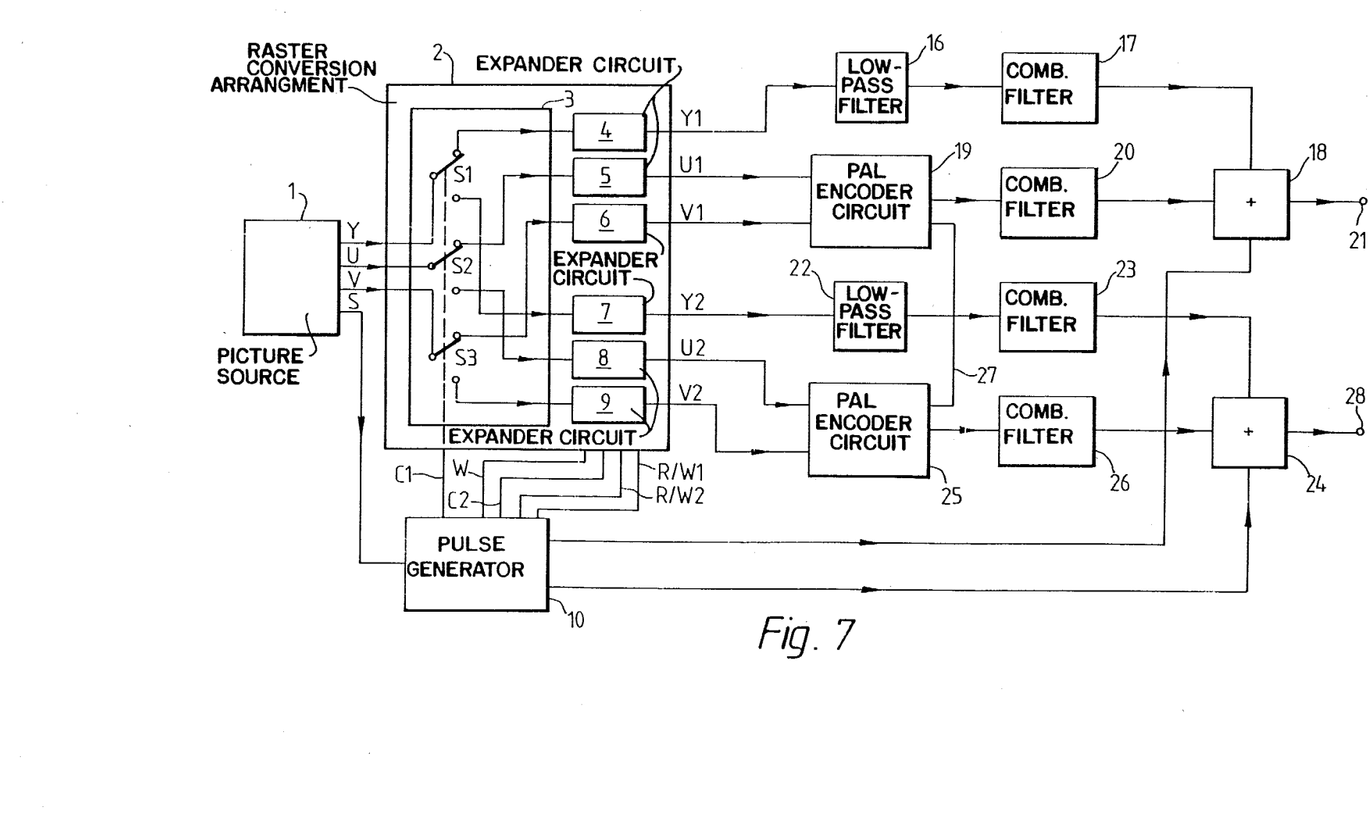
FIG. 7 is a block diagram of television transmission equipment according to the invention.
Figure 8:
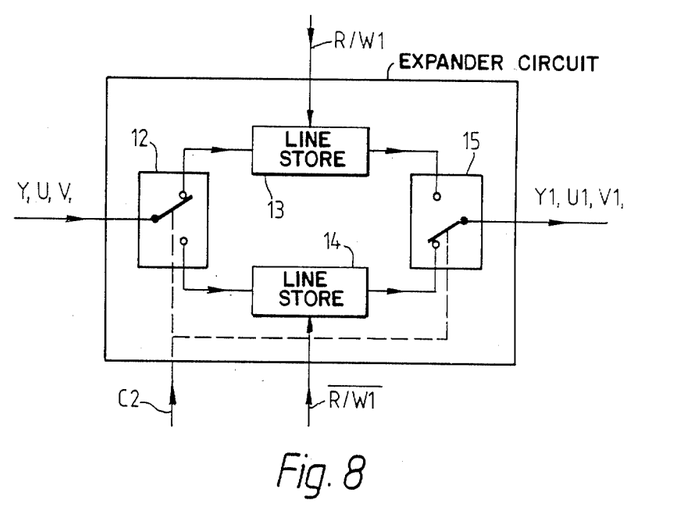
FIGS. 8 and 9 are block diagrams of parts of the equipment of FIG. 7.

FIG. 7 shows a block diagram of television transmission equipment which can be used for transmitting the wide picture format color television transmission system described above. A television picture source 1 for a picture having an aspect ratio 5:3 provides luminance signals Y, color difference signals U and V and synchronizing signals S for a television picture having 1249 lines, at a picture rate of 25 frames per second with two fields per frame with a luminance bandwidth of 12 MHz. The line period for such television signals would as previously described, be on the order of 32 $\mu$s. The terms U and V are used to differentiate between the color difference signals B-Y and R-Y, respectively. The luminance and color difference signals are applied to a raster conversion arrangement 2 which comprises a switching arrangement 3 and a number of expander circuits 4, 5, 6, 7, 8 and 9. The switching arrangement 3 comprises three (electronic) change-over switches S1, S2 and S3, the moving contact of S1 receiving the luminance signal Y, while those of switches S2 and S3, respectively, receive the color difference signals U and V. The switches S1, S2 and S3 are controlled in synchronism from a control input C1 by pulses derived from a pulse generator 10 which is itself synchronized by the synchronizing signals S from the picture source 1. The switching arrangement 3 is arranged such that each change-over switch occupies the position shown during alternate line periods of a field of the 1249 line signal while the switches occupy their other position during the intervening line periods of that field. Thus in a first field these switches might be in the position shown for odd numbered lines and in their other position for even numbered lines. The outputs from the change-over switches S1, S2 and S3 are connected as shown to the inputs of associated expander circuits 4, 5, 6, 7, 8 and 9 whose outputs form the outputs of the raster converter arrangement 2. The expander circuits 7, 8 and 9 are each of the same construction as that of the converter present in FIG. 1 of Philips Research Reports 29, 1974, pages 413 to 428, or the converter circuit 23 in FIG. 1 of U.K. Pat. No. 2 000 413B and which is shown in FIG. 8 but operates in a different manner to be described. The Y, U or V input in FIG. 8 is connected to the moving contact of an (electronic) change-over switch 12, controlled from a control input C2, whose outputs are, respectively, connected to separate line stores 13 and 14, the outputs of the line stores 13 and 14 being applied to respectively stationary inputs of a further (electronic) change-over switch 15, also controlled from control input C2, whose moving contact forms the output of the expander circuit. The operation of the expander circuit is such that switches 12 and 15 occupy the positions shown for two consecutive line periods of the 1249 line signal from the picture source 1 during half of which time a television line of a field is read into the line store 13 under the control of its read/write input R/W1. During the preceding two consecutive line periods of the 1249 line signal the previous alternate line of the 1249 line signal was read into the picture store 14 under the control of its read/write input $\overline{R/W1}$ and with switch 15 in the position shown that previous line is read out from picture store 14 under the control of input R/W1 at substantially half the rate at which this line was read into that picture store. The expander circuits therefore produce video information which occupies approximately or slightly longer than twice the period during which it was read-in depending on the time per line this information is to occupy, such information occupying only half the bandwidth (6 MHz) that it was read-in. The outputs from the expander circuits 7, 8 and 9 form the respective outputs $Y_2$, $U_2$ and $V_2$ of the raster conversion arrangement 2, these luminance and color difference signals being from the alternate lines of a field of the 1249 line signal.

Figure 9:
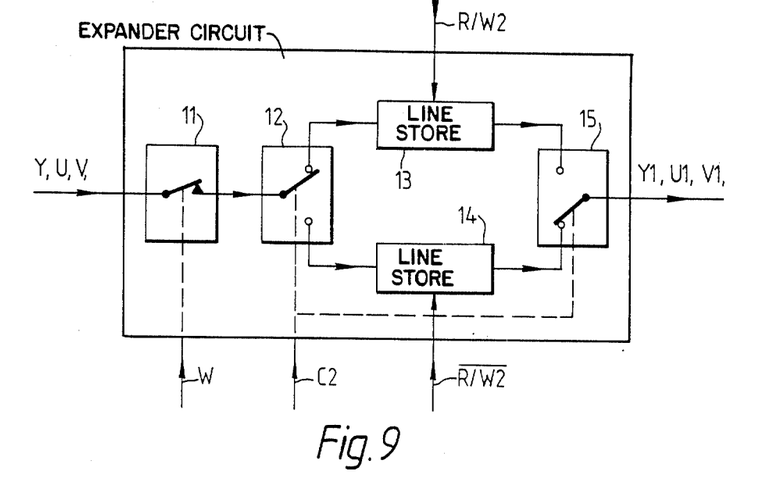

The expander circuits 4, 5 and 6 are of a similar construction to that of expander circuits 7, 8 and 9 but have, in addition, a gate circuit provided in the input to the switch 12. A block diagram for an expander circuit 4, 5 or 6 is shown in FIG. 9 in which corresponding components appearing in FIG. 8 are given the same reference numerals. The Y, U or V input in FIG. 9 is applied to the input of a gate circuit 11 shown as a switch, the output of which is connected to the moving contact of change-over switch 12. Gate circuit 11 is controlled by a window pulse W which pulse closes the gate circuit for that period during each line of the input signal which corresponds to the picture content for a 4:3 aspect ratio and so preventing the beginning and end of each line of the input signal from being loaded into the line stores 13 and 14. The remainder of the expander circuit operates in a corresponding manner as that described for FIG. 8 with the picture information from each applied line being expanded to occupy 52 $\mu$s with control being exercised by read/write inputs R/W2 and R/W2. The outputs of the expander circuits 4, 5 and 6 form the respective outputs $Y_1$, $U_1$ and $V_1$ of the raster conversion arrangement 2, these luminance and color difference signals being from the intervening lines of the corresponding field of the 1249 line signal.

The signals associated with the outputs $Y_1$, $U_1$ and $V_1$ and with $Y_2$, $U_2$ and $V_2$ each form a 625 line signal having the same picture rate of 25 frames per second with two interlaced fields per frame. The expanded luminance signal $Y_1$ is applied through a low pass filter 16 having a cut-off frequency of 5.5 MHz and a comb filter 17 to a first input of an adder circuit 18. The comb filter 17 is included to prevent cross-color interference in the luminance signal and may be of conventional design. Such comb filters are described in Colour Television, Volume 2, by P. S. Carnt and G. B. Townsend, published by Iliffe Books Limited, 1969 at Chapter 4. Suitable comb filters may operate at line or field rate and may be either adaptive or non-adaptive. The $U_1$ and $V_1$ color difference signals are applied to respective inputs of a PAL encoder circuit 19 where the color difference signals are used to modulate the color subcarrier of nominal 4.44 MHz in conventional manner, the modulated subcarrier together with the usual reference burst of this subcarrier being applied through a second comb filter 20 to a second input of the adder circuit 18. The comb filter 20 is included to prevent cross-luminance interference in the modulated subcarrier and may also be of conventional design. A third input of adder circuit 18 receives the normal synchronizing and blanking signals from generator 10. The signal inputs to the adder circuit 18 are added therein to produce a composite television signal at an output 21 which composite signal substantially corresponds to the PAL color television signal as transmitted in the United Kingdom.

The luminance signal $Y_2$ from the raster conversion arrangement 2 is applied through a second low-pass filter 22 having a cut-off frequency of 6 MHz and a third comb filter 23 to a first input of a second adder circuit 24, the comb filter 23 being of the same design and for the same purpose as comb filter 17. In a similar manner to signals $U_1$ and $V_1$, the color difference signals $U_2$ and $V_2$ are applied to respective inputs of a second PAL encoder circuit 25 where these signals modulate the color subcarrier in like manner as above. The resulting modulated subcarrier and reference burst of this subcarrier are applied through a fourth comb filter 26 to a second input of the adder circuit 24, the comb filter 26 being of the same design and for the same purpose as comb filter 20. If sufficient room is available per television line, then a third input of the adder circuit 24 may receive blanking and synchronizing signals from the generator 10 by the connection shown. However, if the television lines convey picture information for a period longer than normal then the reference color burst may be used for synchronizing purposes. For this reason a connection 27 is shown between the two PAL encoders 19 and 25 which may be used to ensure a given phase relationship between the color subcarrier in these encoders. The inputs to the adder circuit 24 are added therein and the resulting television signal applied to an output terminal 28. The 625 line signal appearing at output terminal 28 is that of FIG. 6 which represents the wider format picture information for a picture of aspect ratio 5:3, adjacent lines of which are derived from intervening lines of the 1249 line signal whose alternate lines provide information for the adjacent lines of the signal at output terminal 21. The signals at output terminals 21 and 28 are applied to separate transmission paths which may be separate video recorders or separate transmission channels in the UHF or even higher frequency bands. Alternately, it is possible for the signals present at these output terminals to form the respective upper and lower sidebands of a broadcast transmission. Although the signal at output terminal 21 requires to be transmitted as a conventional broadcast television signal, this is not necessary for the signal at terminal 28 which may be transmitted in any convenient form which may not in itself be compatible with normal television signals.

Figure 10:
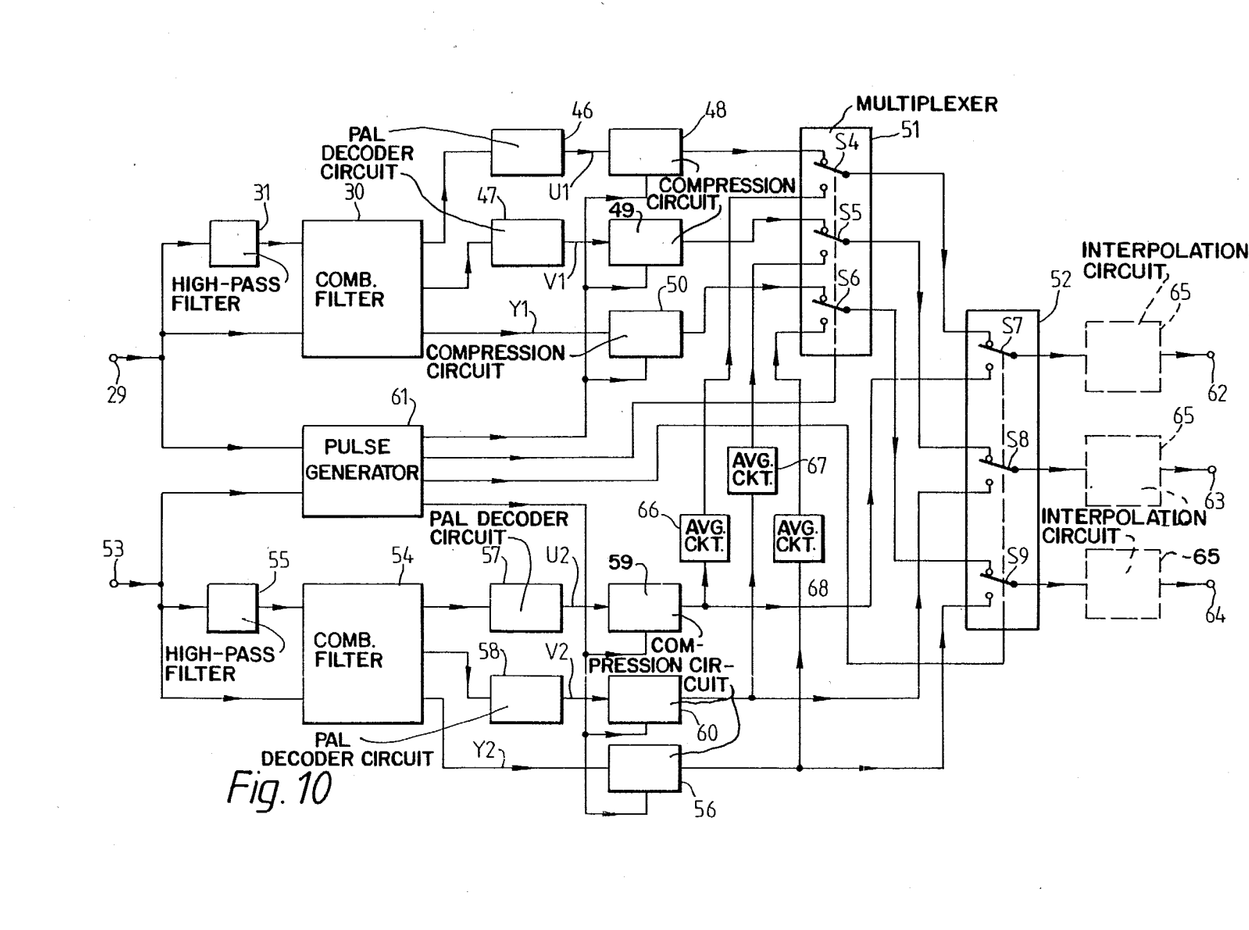
FIG. 10 is a block diagram of television reception equipment according to the invention.
Figure 11:
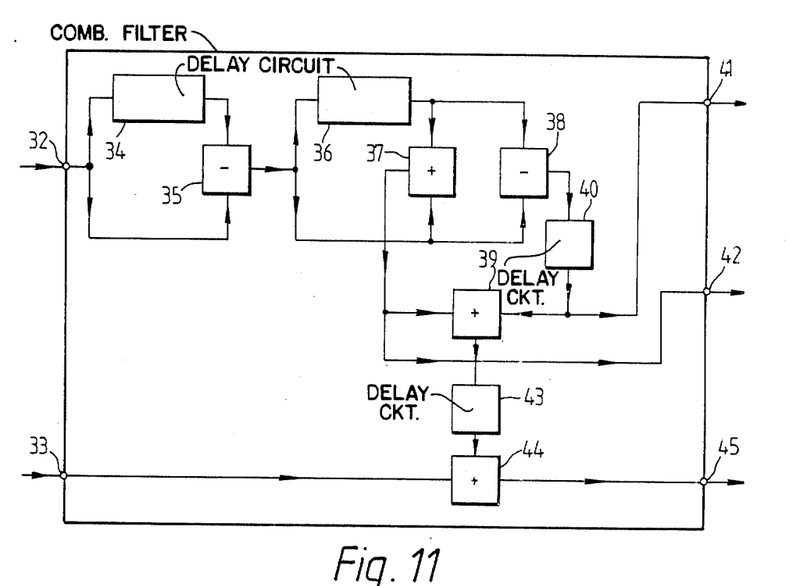
FIG. 11 is a block diagram of a comb filter for use in the equipment of FIG. 10.

A television receiver suitable for use with the above television transmission system is shown in block diagram form in FIG. 10. The signal of FIG. 5, transmitted from output terminal 21 of the transmitter of FIG. 7 by way of its associated transmission path, is received at input terminal 29, the necessary equipment for processing this signal between these terminals being omitted as it would be of conventional design and not necessary for an understanding of the present invention. The incoming signal is applied to a first input of a comb filter 30 by way of a high-pass filter 31 having a cut-off frequency of 3 MHz so that this first input only receives the luminance signal above 3 MHz and the subcarrier modulated by the color difference signals. A second input of the comb filter 30 receives the incoming signal direct from input terminal 29 comprising the whole of the luminance and the modulated subcarrier. The comb filter 30 separates the luminance and color difference modulated signals to produce the luminance signal $Y_1$ and the separate $U_1$ and $V_1$ color difference signals modulated on the color subcarrier. The comb filter 30 may take one of a number of known forms, a suitable filter being that shown in FIG. 4.6 on page 169 of Colour Television, Volume 2 mentioned above. For the sake of showing additional connections, the construction of that comb filter is redrawn in FIG. 11 where inputs 32 and 33 are, respectively, connected to the high pass filter 31 and directly to input terminal 29. Input 32 is connected through a 64 μs delay circuit 34 to a first input of a difference circuit 35 whose second input is directly connected to input 32. The output of difference circuit 35 is connected through a delay circuit 36 providing a delay of 63.943 μs to the first input of respective adder (37) and difference (38) circuits, the second input of these two circuits being directly connected to the output of difference circuit 35. The output of the adder circuit 37 is connected to a first input of a further adder circuit 39 while the output of the difference circuit 38 is connected through a 57 ns delay circuit 40 to the second input of the adder circuit 39. The output of delay circuit 40 is also connected to an output 41 of the comb filter at which the U component modulted on the subcarrier appears, while the output of the adder circuit 37 is also applied to an output 42 of the comb filter at which the V component modulated on the subcarrier also appears. The output of the adder circuit 39 which comprises the combination of the quadrature related subcarrier signals is applied through a 28.5 ns delay circuit 43 to a first input of a further adder circuit 44. The second input of the adder circuit 44 is directly connected to the input 33 and so receives the full luminance and modulated subcarrier signals, these modulated subcarrier signals being of opposite phase to these appearing at the first input of this adder circuit 44. The output of the adder circuit 44 is connected to an output 45 of the comb filter at which the luminance circuit Y appears substantially free from subcarrier components. The separated U and V modulated subcarrier signals from the comb filter 30 are applied to respective PAL decoder circuits 46 and 47 to produce from respective outputs the demodulated U and V color difference signals. These signals are applied to respective 625/1249 compression circuits 48 and 49 while the luminance signal Y1 from the comb filter 30 is directly applied to a further 625/1249 compression circuit 50. The compression circuits 48, 49 and 50 are of the same design and take the form of the circuit shown in FIG. 8, the object of the compression circuits being to compress the incoming signal information such that it only occupies a space of 20 μs. The mode of operation of the compression circuits is, in fact, as described in the above-mentioned Philips Research Reports 29 or U.K. Pat. No. 2 000 413B. The outputs of the compression circuits are connected to respective first inputs of (electronic) switches S4, S5 and S6 in a multiplexer 51 controlled from a pulse generator 61, the moving contacts of these switches remaining in the position shown for the 20 μs during which the picture information is present. The moving contacts of switches S4, S5 and S6 are, respectively, connected to first inputs of (electronic) switches S7, S8 and S9 of a switching arrangement 52, the moving contacts of each being in the position shown for each line reproduced from the signal present at input terminal 29.

Figure 6:
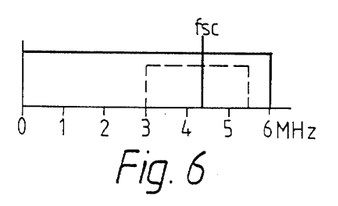

The signal of FIG. 6 transmitted from output terminal 28 of the transmitter in FIG. 7 is received in the above-described manner at an input terminal 53. The incoming signal is applied to a first input of a comb filter 54 by way of a high pass filter 55 having the same cut-off frequency as that for filter 31. The second input of comb filter 54 is directly connected to input terminal 53. Comb filter 54 has the same purpose and may be of the same construction as comb filter 30 and again separates the luminance and color difference modulated signals with the luminance signal Y2 being directly applied to a 625/1249 compression circuit 56. U and V color difference signals modulated on the subcarrier are, respectively, applied to PAL decoder circuit 57 and 58 to respectively produce the U2 and V2 color difference signals which are themselves, respectively, applied to 625/1249 compression circuits 59 and 60. The compression circuit 56, 59 and 60 are of the same construction as that shown in FIG. 8 and operate in substantially the same manner as that for compression circuits 48, 49 and 50 save that read-out of the applied picture information is achieved in 26 μs, 6 μs longer than that for line compression circuits 48, 49 and 50. The reason for this is that the signals from the compression circuits 56, 59 and 60 represent the wider picture format information while those from 48, 49 and 50 represent the narrower picture format information. The outputs of the compression circuits 56, 59 and 60 are applied to the second inputs of the switches S9, S7 and S8 which switches are controlled from a pulse generator 61 (which, from the synchronizing signals contained in the signals at inputs 29 and 53, also produces the necessary read/write signals for the 625/1249 line compression circuits), so that the moving contacts are in the position shown for alternate lines of the 1249 line signal being constructed while these contacts are in the position not shown in the intervening lines of the 1249 line signal. In this way, the outputs from the three switches S7, S8 and S9 alternately produce an output signal from the input terminals 29 and 53 which are, respectively, applied to output terminals 62, 63 and 64 which convey the U, V and Y signals. The signals present in output terminals 62, 63 and 64 can be applied to a color display such as one containing a wide screen high definition shadow mask tube or to a wide television projector to produce a wide screen display. If desired, prior to appearing at these output terminals each signal may be subjected to interpolation in an interpolator circuit 65.

As so far described, the signal appearing at the output terminals, when switching arrangement 52 has its switches in the position shown, would only produce an output during 20 μs of each line while in the other position it would produce an output signal during 26 μs of each line. This is overcome by the remaining circuit connections shown in FIG. 10. The outputs of compression circuits 59, 60 and 56 are, respectively, connected through an associated averaging circuit 66, 67 and 68 to the second inputs of the switches S4, S5 and S6 of multiplexer 51. The averaging circuits 66, 67 and 68 may be of the same design and in their simplest form might individually comprise a delay circuit having a delay period of 32.03 μs or might be of a more complex construction. One of the objects of the averaging circuits is to delay the signals produced from the compression circuits 59, 60 and 56 such that they occur during those lines when signals are produced by the compression circuits 48, 49 and 50. The moving contacts of switches S4, S5 and S6 are operated by a window pulse derived by the pulse generator 61 such that these switches are in the position shown for the 20 μs period as previously mentioned but for at least the 3 μs preceding and following the 20 μs these switches occupy their other positions to produce at its output a portion of the signals from the converters 59, 60 and 56 prior to and following the signals from the converters 48, 49 and 50. In this way, the outputs of the multiplexer 51 produce signals during the 26 μs period made up from the input signals of the input terminals 29 and 53.

In the above described system and associated transmission and reception equipment, the position of the picture portion of standard aspect ratio (4:3) is static in relation to the whole. Under certain circumstances it would be preferably for the standard aspect ratio portion to be movable within the wider format so that when the second television signal is received on its own, a display of standard aspect ratio can be produced which contains the area of main interest. In order to allow a correct reproduction on a wide format receiver a steering signal may be present in the wider format television signal for controlling the generation of the window pulses in such a receiver so that the video contact from the standard and wider format television signals are combined in the correct manner. Such a steering signal may be transmitted during either the line or field blanking periods of the wider format television signal, field rate being quite adequate for this purpose as positional changes in the steered picture would only take place at field rate.

The above description of a television transmission system and associated transmission and reception equipment has been in relation to television signals where the luminance and chrominance components are frequently multiplexed. However, it will be appreciated that the invention is not so limited and the luminance and chrominance components may be time multiplexed as provided in U.S. Pat. No. 4,335,393 or in the MAC (Multiplexed Analogue Component) system as recently proposed by the Independent Broadcasting Authority.

I claim:

1. A method for simultaneously transmitting television signals depicting the same scene, for standard and wide picture formats of, respectively, a standard aspect ratio and a wider than standard aspect ratio, in which both picture formats have the same height, said method comprising the steps: converting a wide-band television signal, which represents the full width of the wide picture format and has n lines per picture, into a first narrower-band television signal, which also represents the full width of the wide picture format and has m lines per picture, where m is substantially ½n and both said wide-band and said first narrower-band television signals have the same field and picture rates, in which said conversion comprises deriving respective adjacent lines of a field of said first narrower-band television signal of respective alternate lines in a field of said wide-band television signal, characterized in that said method further comprises converting said wide-band television signal into a second narrower-band television signal representing the width of the standard picture format and having the same number of lines and the field and picture rates as said first narrower-band television signal, in which said conversion comprises deriving respective adjacent lines of a corresponding field of said second narrower-band television signal from the respective intervening lines of the field of said wide-band television signal, and transmitting said first and second narrower-band television signals by way of respective first and second transmission paths, wherein the transmissions from said first and second transmission paths may be received together and a wide-band television signal having n lines per picture reconstituted from said first and second narrower-band television signals for reproduction as a wide picture format television display or the transmission from the second transmission path may be received alone for reproduction as a television display of standard picture format and normal quality as herein defined.

2. A method for transmitting television signals as claimed in claim 1, in which said first and second narrower-band television signals are color television signals and the transmissions by way of said first and second transmission paths contain periodic bursts at the frequency of a color subcarrier, characterized in that on reception, the color subcarrier bursts in the first transmission path are employed to synchronize said first narrower-band television signal.

3. A method of transmitting television signals as claimed in claim 1 or 2, characterized in that said first narrower-band television signal contains a steering signal during a blanking interval thereof for controlling the reconstruction of said wide-band television signal from said first and second narrower-band television signals.

4. A method of transmitting television signals as claimed in claim 1 or 2, characterized in that said first and second transmission paths comprise respective first and second radio frequency television channels having different carrier frequencies.

5. A method of transmitting television signals as claimed in claim 1 or 2, characterized in that said first and second transmission paths comprise the respective lower and upper or upper and lower sidebands of a radio frequency transmission.

6. A method of transmitting television signals as claimed in claim 1 or 2, characterized in that said first and second transmission paths are the record/reproduce channels of video recorder apparatus.

7. A method of transmitting television signals as claimed in claim 2, in which said first and second transmission paths are the record/reproduce channels of separate video tape recorders, characterized in that said recorders are controlled to ensure synchronization therebetween by the periodic bursts at the frequency of said color subcarrier in the transmission of said first and second transmission paths.

8. Television transmission equipment for simultaneously transmitting television signals depicting the same scene, for standard and wide picture formats of, respectively, a standard aspect ratio and a wider than standard aspect ratio, in which both picture formats have the same height, said transmission equipment comprising means for providing a wide-band television signal having n lines per picture representing the full width of the wide picture format, means for producing from said wide-band television signal, a first narrower-band converted television signal of m lines per picture, where m is substantially ½n, and having the same field and picture rates and representing the full width of the wide picture format as said wide-band television signal, said first converted television signal having respective adjacent lines of a field derived from respective alternate lines of a field of said wide-band television signal, characterized in that said equipment additionally comprises means for simultaneously producing from said wide-band television signal, a second narrower-band converted television signal having the same number of lines and the same field and picture rates as said first converted television signal, said second converted television signal representing the reduced width of the standard picture format and having respective adjacent lines of a field derived from respective intervening lines of a field of said wide-band television signal.

9. Television transmission equipment as claimed in claim 8, in which a raster conversion arrangement is provided for receiving said wide-band television signal and for producing therefrom said first converted television signal expanded in time to occupy substantially twice the period per line as that of said wide-band television signal, characterized in that said raster conversion arrangement also produces from said wide-band television signal said second converted television signal also expanded in time to occupy substantially twice the period per line as that of said wide-band television signal.

10. Television transmission equipment as claimed in claim 9, characterized in that the period per line occupied by picture information is greater in said first converted television signal than in said second converted television signal.

11. Television transmission equipment as claimed in claim 8, 9 or 10, which equipment is for the transmission of color television signals, characterized in that synchronizing bursts at the frequency of a color subcarrier are included in said first and second converted television signals and have a given phase relationship.

12. Television reception equipment for simultaneously receiving television signals depicting the same scene, for standard and wide picture formats of, respectively, a standard aspect ratio and a wider than standard aspect ratio, in which both picture formats have the same height, said reception equipment, comprising a first input for receiving a first of said television signals having m lines per picture, means for time compressing said first television signal for producing a first compressed television signal having m lines per picture and the same field and picture rates as said first television signal, said first compressed television signal containing picture information in alternate of its lines which information represents the full width of the wide picture format, characterized in that said reception equipment additionally comprises a second input for receiving a second of said television signals also having m lines per picture, means for time compressing said second television signal for producing a second compressed television signal having the same number of lines and the same field and picture rates as said first compressed television signal, said second compressed television signal containing picture information in alternate of its lines which information represents the reduced width of said standard picture format, means for adding to said second compressed television signal, picture information from said first compressed television signal which represents those portions which lie outside the width of said standard format to produce a modified second compressed television signal, and means for combining said first compressed television signal and said modified second compressed television signal to produce a wide-band television signal having picture information in each line which represents the full width of said wide picture format.

* * * * *